US011375441B2

United States Patent
Nuwula et al.

(10) Patent No.: US 11,375,441 B2
(45) Date of Patent: Jun. 28, 2022

(54) SYSTEMS AND METHODS FOR CONNECTING WIRELESS CLIENTS TO PREFERRED EDGE DEVICES IN ACTIVE-ACTIVE DEPLOYMENTS

(71) Applicant: Versa Networks, Inc., Santa Clara, CA (US)

(72) Inventors: Rajesh Kumar Nuwula, Sunnyvale, CA (US); Anindya Bhowmick, Sunnyvale, CA (US); Monil Patel, Bengaluru (IN); Vyasraj Sagar, Bengaluru (IN)

(73) Assignee: Versa Networks, Inc., San Jose, CA (US)

( * ) Notice: Subject to any disclaimer, the term of this patent is extended or adjusted under 35 U.S.C. 154(b) by 67 days.

(21) Appl. No.: 17/008,512

(22) Filed: Aug. 31, 2020

(65) Prior Publication Data
US 2022/0070762 A1 Mar. 3, 2022

(51) Int. Cl.
*H04W 48/16* (2009.01)
*H04W 8/00* (2009.01)
(Continued)

(52) U.S. Cl.
CPC .......... *H04W 48/16* (2013.01); *H04B 17/318* (2015.01); *H04L 45/586* (2013.01);
(Continued)

(58) Field of Classification Search
CPC ......... H04B 17/318; H04L 45/58–586; H04W 8/005; H04W 48/08–20; H04W 60/00; H04W 76/11; H04W 84/12; H04W 84/20
See application file for complete search history.

(56) References Cited

U.S. PATENT DOCUMENTS

2008/0080388 A1\* 4/2008 Dean .................. H04W 92/20
370/252
2016/0309537 A1\* 10/2016 Hart .................. H04W 76/18
(Continued)

OTHER PUBLICATIONS

Gast, Matthew S. "802.11 Wireless Networks: The Definitive Guide", 2nd Edition, Chapter 4. 802.11 Framing in Detail, released Apr. 2005, 84 pages.

(Continued)

*Primary Examiner* — Ronald Eisner
(74) *Attorney, Agent, or Firm* — Loza & Loza, LLP

(57) ABSTRACT

A WI-FI access point can be configured to communicate with a service set using a service set identifier (SSID) and to respond to, or not respond to, probe requests based on whether the WI-FI access point is a preferred access point for the SSID. The WI-FI access point can have a probe suppression indicator that indicates suppressive when the access point is not preferred and that indicates responsive when the access point is preferred. Transmitting a WI-FI beacon having a SSID value equaling the SSID can inform WI-FI clients of the service set. The WI-FI clients can transmit probe requests having SSID values equaling the SSID. The WI-FI access point can suppress sending probe responses responsive to the probe requests when the probe suppression indicator indicates suppressive. The WI-FI access point can send probe responses responsive to the probe requests when the probe suppression indicator indicates responsive.

20 Claims, 11 Drawing Sheets

(51) Int. Cl.
      *H04W 60/00*     (2009.01)
      *H04L 45/586*    (2022.01)
      *H04B 17/318*    (2015.01)
      *H04W 84/20*     (2009.01)
      *H04W 84/12*     (2009.01)

(52) U.S. Cl.
      CPC ........... *H04W 8/005* (2013.01); *H04W 60/00* (2013.01); *H04W 84/20* (2013.01); *H04W 84/12* (2013.01)

(56) References Cited

U.S. PATENT DOCUMENTS

2019/0090291 A1    3/2019  Jain
2019/0289488 A1*  9/2019  Jain .................. H04W 28/0289

OTHER PUBLICATIONS

Nadas, Stephen, "Virtual Router Redundancy Protocol (VRRP) Version 3 for IPv4 and IPv6", Mar. 2010, 41 pgs.

* cited by examiner

SYSTEMS AND METHODS FOR CONNECTING WIRELESS CLIENTS TO PREFERRED EDGE DEVICES IN ACTIVE-ACTIVE DEPLOYMENTS

TECHNICAL FIELD

The embodiments herein relate to wireless networks, wireless clients, WI-FI networks, wireless access points, and connecting wireless clients to preferred wireless access points.

BACKGROUND

Wireless clients can connect to communications networks via wireless access points using WI-FI technologies. WI-FI refers to communications complying with the IEEE 802.11 suite of protocol standards created and maintained by the Institute of Electrical and Electronics Engineers (IEEE). WI-FI is generally considered a layer 2 protocol because it relates to direct wireless connections between wireless devices.

In many cases, a WI-FI client device accesses the Internet after first associating with a WI-FI access point, thereby forming a layer 2 connection. The WI-FI client can then use layer 3 protocols, such as internet protocol (IP), to communicate with remote devices via a route consisting of multiple layer 2 links. For wireless clients, the first hop in the route is the wireless link between client and access point. In many cases, the strength of that first hop connection is dispositive of the quality of a wireless client's connection with a remote device. In other cases, the access point's connection to the internet is dispositive of connection quality.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented by a WI-FI access point configured to communicate with a service set using a service set identifier (SSID). The method includes setting a probe suppression indicator to indicate suppressive, sending a WI-FI beacon having a SSID value indicating the SSID, and receiving a probe request, the SSID value of the probe request indicating the SSID. The method also includes determining, based at least in part on the probe suppression indicator, to suppress a probe response responsive to the probe request, and suppressing the probe response.

Another aspect of the subject matter described in this disclosure can be implemented in a WI-FI access point configured to communicate with a service set using a service set identifier (SSID), set a probe suppression indicator to indicate suppressive, send a WI-FI beacon having a SSID value indicating the SSID, receive a probe request, the SSID value of the probe request indicating the SSID, and suppress, based at least in part on the probe suppression indicator, a probe response responsive to the probe request.

A further aspect of the subject matter described in this disclosure can be implemented in a WI-FI access point comprising a means for communicating with a service set using a service set identifier (SSID), a means for indicating a state as suppressive or responsive for the SSID, a means for setting the state, and a means for changing the state. The WI-FI access point can also comprise a means for transmitting a beacon, the beacon having a means for indicating the SSID, a means for receiving a probe request, the probe request having a means for indicating the SSID, a means for suppressing a probe response based on the state, and a means for transmitting the probe response based on the state.

In some implementations of the methods and devices, the method can include setting the probe suppression indicator to indicate responsive, receiving a second probe request, the SSID value of the second probe request indicating the SSID, determining, based at least in part on the probe suppression indicator, to transmit a second probe response responsive to the second probe request, and transmitting the second probe response.

In some implementations of the methods and devices, the method can include receiving a second probe request, the SSID value of the second probe request indicating the SSID. The method can also include determining, based at least in part a received signal strength of the second probe request, to transmit a second probe response responsive to the second probe request wherein the probe suppression indicator indicates suppressive. The method can additionally include transmitting the second probe response.

In some implementations of the methods and devices, the method can include receiving a WI-FI packet from a second WI-FI access point, the SSID value of the WI-FI packet indicating the SSID, and determining that the second WI-FI access point is preferred over the WI-FI access point for the SSID, and setting the probe suppression indicator to suppressive. In some implementations of the methods and devices, the method can include transmitting the probe response after determining that a second WI-FI access point is unresponsive to the probe request. In some implementations of the methods and devices, the method can include setting the probe suppression indicator to responsive after determining that a second WI-FI access point is unresponsive to the probe request.

In some implementations of the methods and devices, the method can include setting the probe suppression indicator to responsive in accordance with a command received from a controller, wherein the probe suppression indicator of a second WI-FI access point is set to suppressive in response to another command sent by the controller. In some implementations of the methods and devices, the method can include keeping an activity timer that times out after an elapsed time since a second WI-FI access point has transmitted a WI-FI packet for the SSID, and setting the probe suppression indicator to responsive in response to the activity timer timing out.

In some implementations of the methods and devices, the WI-FI access point and a second WI-FI access point are in a virtual router redundancy protocol (VRRP) group having a VRRP master and a VRRP backup, the probe suppression indicator of the WI-FI access point indicates responsive when the WI-FI access point is the VRRP master, the probe suppression indicator of the second WI-FI access point indicates responsive when the second WI-FI access point is the VRRP master, the probe suppression indicator of the WI-FI access point indicates suppressive when the WI-FI access point is the VRRP backup, and the probe suppression indicator of the second WI-FI access point indicates suppressive when the second WI-FI access point is the VRRP backup.

In some implementations of the methods and devices, the WI-FI access point is further configured to set the probe suppression indicator to indicate responsive, receive a second probe request, the SSID value of the second probe request indicating the SSID, determine, based at least in part on the probe suppression indicator, to transmit a second probe response responsive to the second probe request, and transmit the second probe response. In some implementations of the methods and devices, the WI-FI access point is further configured to receive a second probe request, the SSID value of the second probe request indicating the SSID, determine, based at least in part a received signal strength of the second probe request, to transmit a second probe response responsive to the second probe request wherein the probe suppression indicator indicates suppressive, and transmit the second probe response.

In some implementations of the methods and devices, the WI-FI access point is further configured to receive a WI-FI packet from a second WI-FI access point, the SSID value of the WI-FI packet indicating the SSID, determine that the second WI-FI access point is preferred over the WI-FI access point for the SSID, and set the probe suppression indicator to suppressive. In some implementations of the methods and devices, the WI-FI access point is further configured to transmit the probe response after determining that a second WI-FI access point is unresponsive to the probe request. In some implementations of the methods and devices, the WI-FI access point is further configured to set the probe suppression indicator to responsive after determining that a second WI-FI access point is unresponsive to the probe request.

In some implementations of the methods and devices, the WI-FI access point is further configured to set the probe suppression indicator to responsive in accordance with a command received from a controller, wherein the probe suppression indicator of a second WI-FI access point is set to suppressive in response to another command sent by the controller. In some implementations of the methods and devices, the WI-FI access point is further configured to keep an activity timer that times out after an elapsed time since a second WI-FI access point has transmitted a WI-FI packet for the SSID, and set the probe suppression indicator to responsive in response to the activity timer timing out.

In some implementations of the methods and devices, the WI-FI access point further comprises a means for coordinating the state with a second state of a second WI-FI access point. In some implementations of the methods and devices, the second WI-FI access point comprises a second means for communicating with the service set using the service set identifier (SSID), a means for indicating the second state as suppressive or responsive for the SSID, a means for setting the second state, a means for changing the second state, a second means for receiving the probe request, a means for suppressing a second probe response based on the second state, and a means for transmitting the second probe response based on the second state.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE FIGURES

Throughout the description, similar reference numbers may be used to identify similar elements.

DETAILED DESCRIPTION OF EMBODIMENTS

Figure 1:
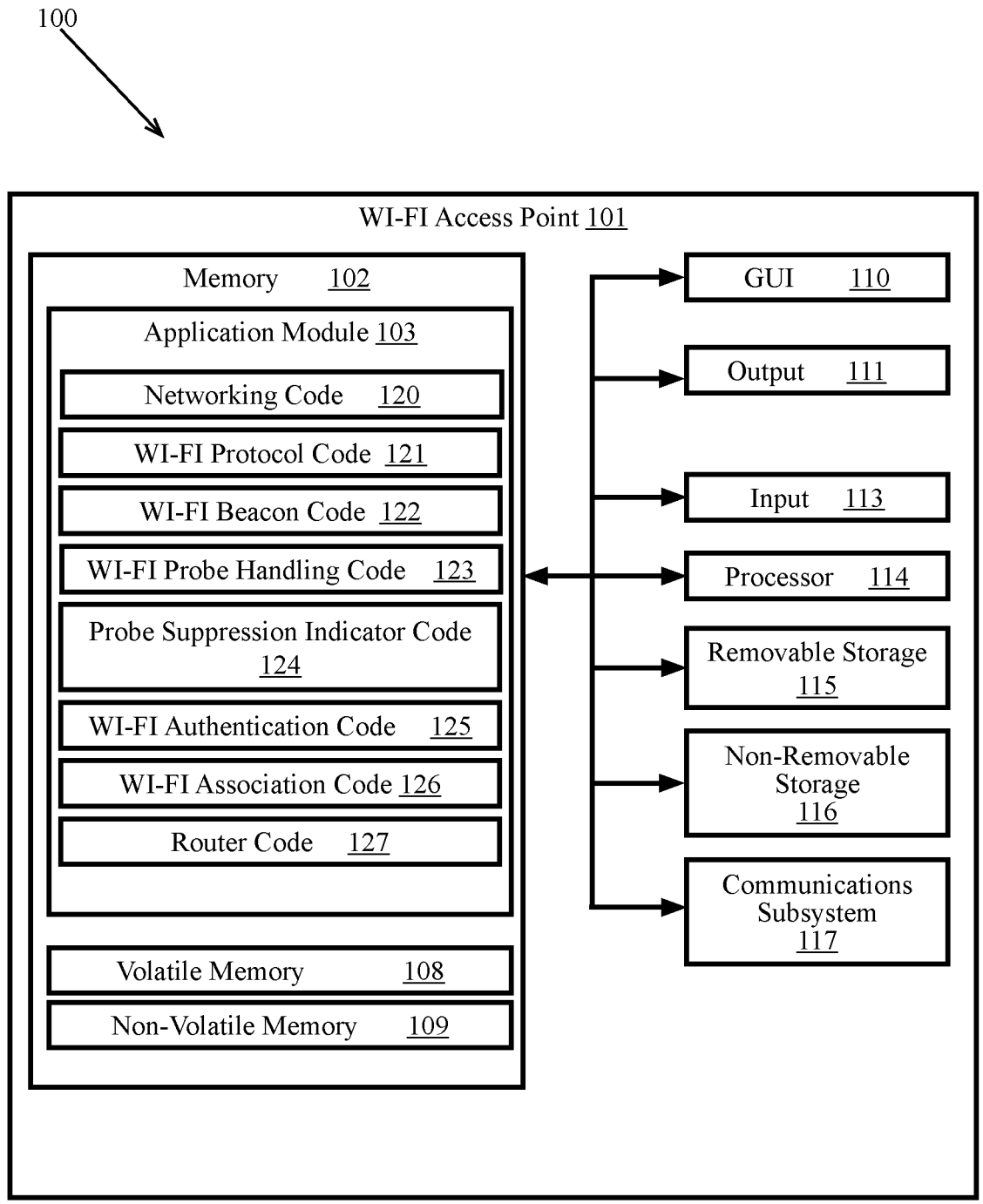
FIG. 1 is a high-level block diagram of a WI-FI access point in which aspects of connecting wireless clients to preferred edge devices in active-active deployments can be implemented.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

A service set is a group of wireless network devices which are identified by the same service set identifier (SSID) and WI-FI access points can provide network access within a service set. In an active-active deployment, two WI-FI access points use the same SSID and can both provide network access within the service set. When two access points are deployed near one another one access point may be the active or preferred access point while the other access point is a redundant or backup device. The deployment being active-active, both access points may be broadcasting WI-FI beacons having the same SSID. As such, a wireless client connecting to the service set may connect to either access point. The wireless client does not know which WI-FI beacons are from the preferred access point and which are from the redundant access point. Systems and methods for connecting the wireless clients to the preferred access point instead of the redundant access point are needed. Connections to the preferred device can be ensured when the redundant device's responses to probe requests are suppressed.

Ensuring connection to the preferred WI-FI access point provides advantages in network traffic shaping. In many deployments, the preferred access point and the redundant access point have different network connectivity. For example, two sites can be connected to one another using two different network connections. The first network connections can be faster, higher in bandwidth, more reliable, or less expensive than the second network connection. The preferred access point may provide connectivity via the first network connection while the redundant access point provides connectivity via the second network connection. It is clearly desirable that most, if not all, wireless clients connect to the preferred access point and thereby use the first network connection unless the preferred access point is down. The wireless clients will connect to the preferred device when the redundant device suppresses its response to WI-FI probes. The redundant device can be responsive to WI-FI probes when the preferred device goes down or is no longer preferred for some other reason. Another advantage is that the WI-FI client devices do not require special configuration or knowledge of which access point is preferred when WI-FI probe responses from the non-preferred device are suppressed.

FIG. 1 is a high-level block diagram 100 of a WI-FI access point 101 in which aspects of connecting wireless clients to preferred edge devices in active-active deployments can be implemented. A computing device in the form of a WI-FI access point 101 configured to interface with controllers, peripheral devices, and other elements disclosed herein, may include one or more processing units 114, memory 102, removable storage 115, and non-removable storage 116. Memory 102 may include volatile memory 108 and non-volatile memory 109. The WI-FI access point 101 may include or have access to a computing environment that includes a variety of transitory and non-transitory computer-readable media such as volatile memory 108, non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data. Of the listed computer storage, volatile memory and most RAM, such as DRAM (dynamic RAM), are transitory while the others are considered non-transitory.

The WI-FI access point 101 may include, or have access to, a computing environment that includes input 113, output 111, and a communications subsystem 117. The WI-FI access point 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 can be provided as an interface to a computer monitor or flat panel display but may include any output device. Output 111 and/or input 113 may include a data collection apparatus associated with WI-FI access point 101. In addition, input 113, which can include an interface to a computer keyboard and/or pointing device such as a computer mouse, computer track pad, touch screen, or the like, allows a user to provide inputs to WI-FI access point 101. A user interface can be provided using output 111 and input 113. Output may include a GUI (graphical user interface) 110. A GUI can be responsive of user inputs entered through input 113 and typically displays images and data via GUI 110. Output 111 can be provided as a web page served via the communications subsystem 117 to a device for display to a user and for receiving inputs from the user. The web page can include GUI 110.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions. The GUI can be a web interface output via the communications subsystem 117 to a device that displays the GUI, receives inputs, and provides the inputs to the WI-FI access point 101 via the communications subsystem 117.

Computer-readable instructions, for example, program code in application module 103, can include or be representative of software routines, software subroutines, software objects, etc. described herein, are stored on a computer-readable medium and are executable by the processor device (also called a processing unit) 114 of WI-FI access point 101. The application module 103 can include computer code such as networking code 120, WI-FI protocol code 121, WI-FI beacon code 122, WI-FI probe handling code 123, probe suppression indicator code 124, WI-FI authentication code 125, WI-FI Association code 126, and router code 127. A hard drive, CD-ROM, RAM, Flash Memory, and a USB drive are just some examples of articles including a computer-readable medium.

Figure 2:
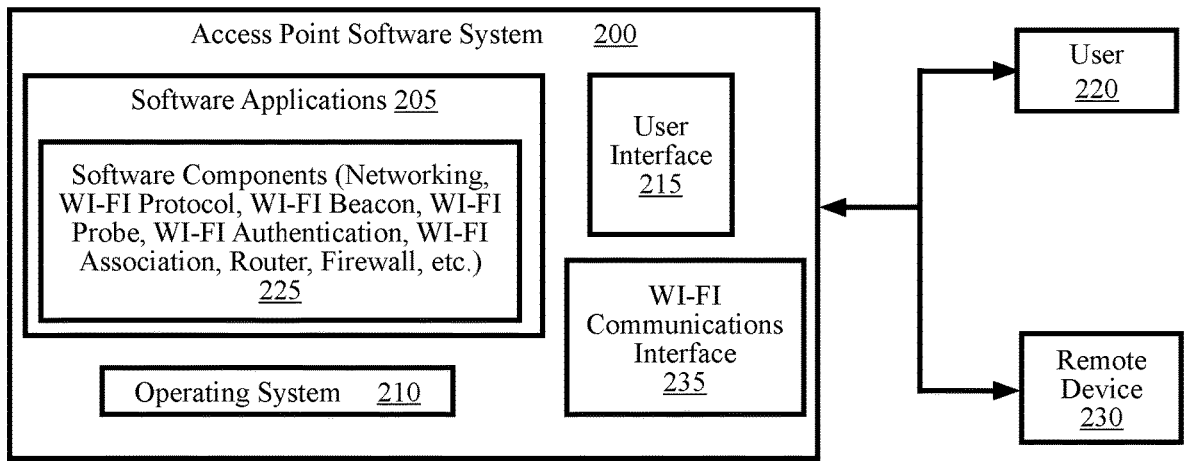
FIG. 2 is a high-level block diagram of a software system, in which aspects of connecting wireless clients to preferred edge devices in active-active deployments can be implemented.

FIG. 2 is a high-level block diagram of a software system, in which aspects of connecting wireless clients to preferred edge devices in active-active deployments can be implemented. FIG. 2 illustrates a software system 200, which may be employed for directing the operation of data-processing systems such as access point 101. Software application 205, may be stored in memory 102, on removable storage 115 or on non-removable storage 116, and generally includes and/or is associated with an operating system 210 and a shell or user interface 215. One or more application programs may be "loaded" (i.e., transferred from removable storage 115 or non-removable storage 116 into the memory 102) for execution by the access point 101. An application program 205 can include software components 225 such as software modules, software subroutines, software objects, network code, user application code, server code, UI code, GUI code, networking code, WI-FI protocol code, WI-FI beacon code, WI-FI probe code, WI-FI authentication code, WI-FI association code, router code, firewall code, etc. The software system 200 can have multiple software applications each containing software components. The access point 101 can receive user commands and data through interface 215, which can include input 113, output 111, and communications connection 1117 accessible by a user 220 or remote device 230. These inputs may then be acted upon by the access point 101 in accordance with instructions from operating system and/or software application 205 and any software components 225 thereof.

Generally, software components 225 can include, but are not limited to, routines, subroutines, software applications, programs, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management, etc. Components can be built or realized as special purpose hardware components designed to equivalently assist in the performance of a task.

The WI-FI communications interface 235 can include a transmitter, receiver, antenna, and other components. The WI-FI interface can be special purpose hardware controlled by the operating system 210 via a device driver. The WI-FI access point can receive transmissions from other WI-FI devices via the WI-FI communications interface. The WI-FI access point can send transmissions to other WI-FI devices via the WI-FI communications interface. The WI-FI communications interface 235 in association with the operating system 210 and software applications 205 can send and receive network packets or frames such as WI-FI beacons, WI-FI probe requests, WI-FI probe responses, and other communications.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a "windows" system, other operation systems such as, for example, a real-time operating system (RTOS) more commonly employed in wireless systems may be employed with respect to operating system and interface 215. The software applications 205 can include, for example, software components 225, which can include instructions for carrying out steps or logical operations such as those shown and described herein.

The description herein is presented with respect to embodiments that can be embodied in the context of, or require the use of, a data-processing system such as access point 101, in conjunction with program code in an application module 103 in memory 102. The disclosed embodiments, however, are not limited to any particular application or any particular environment. Instead, those skilled in the art will find that the systems and methods of the present invention may be advantageously applied to a variety of systems and application software including network routers, software that configures computers as network components, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Figure 3:
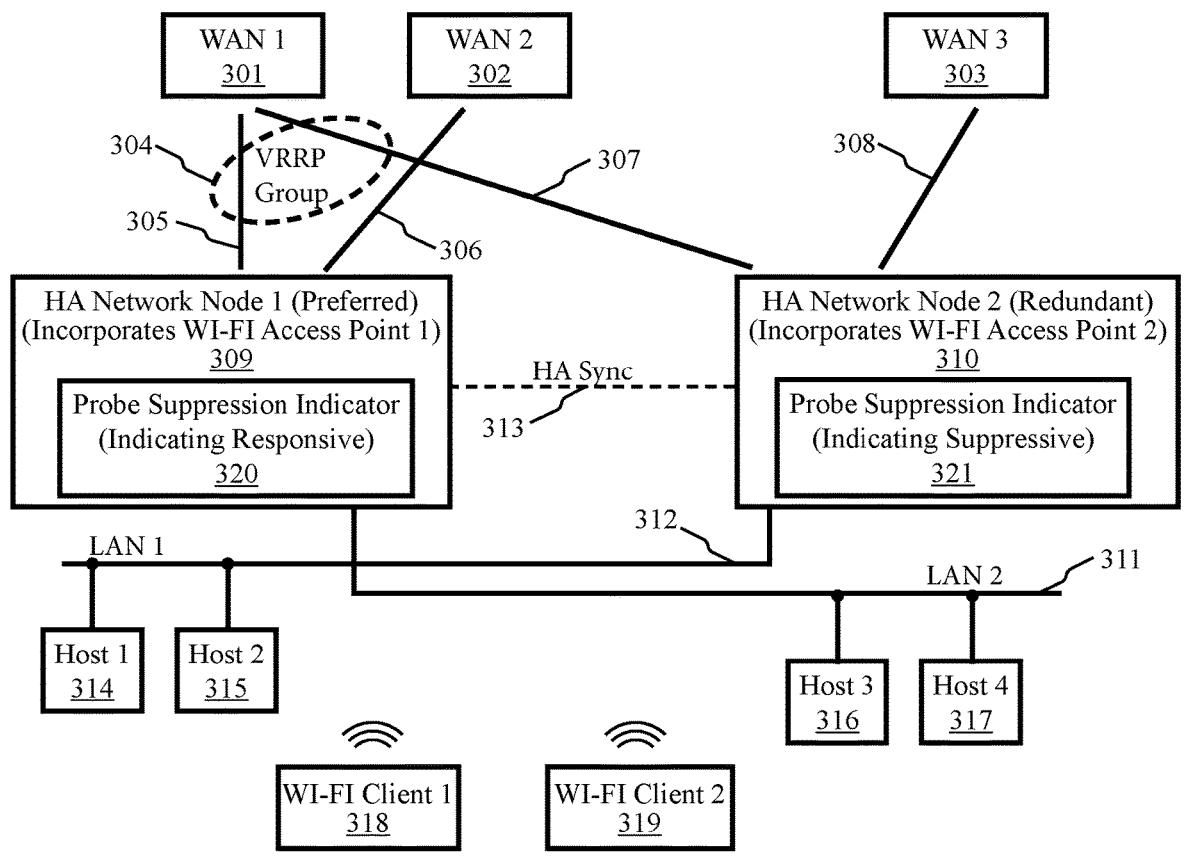
FIG. 3 is a high-level block diagram of high availability network nodes incorporating WI-FI access points, according to some aspects.

FIG. 3 is a high-level block diagram of high availability network nodes 309, 310 incorporating WI-FI access points, according to some aspects. The access point 101 illustrated in FIG. 1 and the software system illustrated in FIG. 2 can implement the HA (high availability) nodes 309, 310. HA network node 1 309 is connected to WAN (wide area network) 1 301 by WAN connection 1 305 and is connected to WAN 2 302 by WAN connection 2 306. HA network node 2 310 is connected to WAN 1 301 by WAN connection 3 307 and is connected to WAN 3 303 by WAN connection 4 308. WAN connection 1 305 and WAN connection 3 307 are in a VRRP (virtual router redundancy protocol) group 304. HA network node 1 309 is illustrated as providing wired network access to host 3 316 and host 4 317 via LAN 2 (local area network 2) 311. HA network node 2 310 is illustrated as providing wired network access to host 1 314 and host 2 315 via LAN 1 312. HA sync 313 is a link between HA network node 1 309 and HA network node 2 310 that can be used to synchronize data, such as probe suppression indicators, and to check if the other node is operating. HA sync 313 can be a direct connection between HA network node 1 309 and HA network node 2 310 or can be a connection carried over one or more LANs, WANs, or other networks.

HA network node 1 309 is shown as the preferred node because it has a probe suppression indicator 320 indicating responsive. HA network node 2 310 is shown as the redundant node because it has a probe suppression indicator 321 indicating suppressive. Redundant nodes can also be called backup nodes or non-preferred nodes. In general, only one of the probe suppression indicators 320, 321 should indicate responsive because only one network node should be preferred at any one time. HA network node 1 309 and HA network node 2 310 can be within the same service set and can therefore transmit WI-FI beacons having the same SSID (service set identifier). SSIDs are generally text strings by which service sets are identified. WI-FI client 1 318 and WI-FI client 2 319 can receive the WI-FI beacons and thereby discover the SSIDs. The WI-FI clients 318, 319 can transmit WI-FI probe requests having SSID fields indicating the SSID. Both HA network nodes 309, 310 can receive the WI-FI probe requests. HA network node 1 309 responds to the WI-FI probe requests because its probe suppression indicator 320 is set to responsive. HA network node 2 suppresses its response to the WI-FI probe requests because its probe suppression indicator 320 is set to suppressive. As such, the only HA network node 1 309, the preferred WI-FI access point, sends WI-FI probe responses. The WI-FI clients therefor connect to the HA network node 1 309. The HA suppressions indicators 309, 310 can be set by a network administrator, perhaps via a GUI, a web hook, etc. The HA suppressions indicators 309, 310 can be set by an external controller or via executable computer code triggered by an event such as detecting a status of another HE network node, a change in VRRP state, etc.

Figure 4:
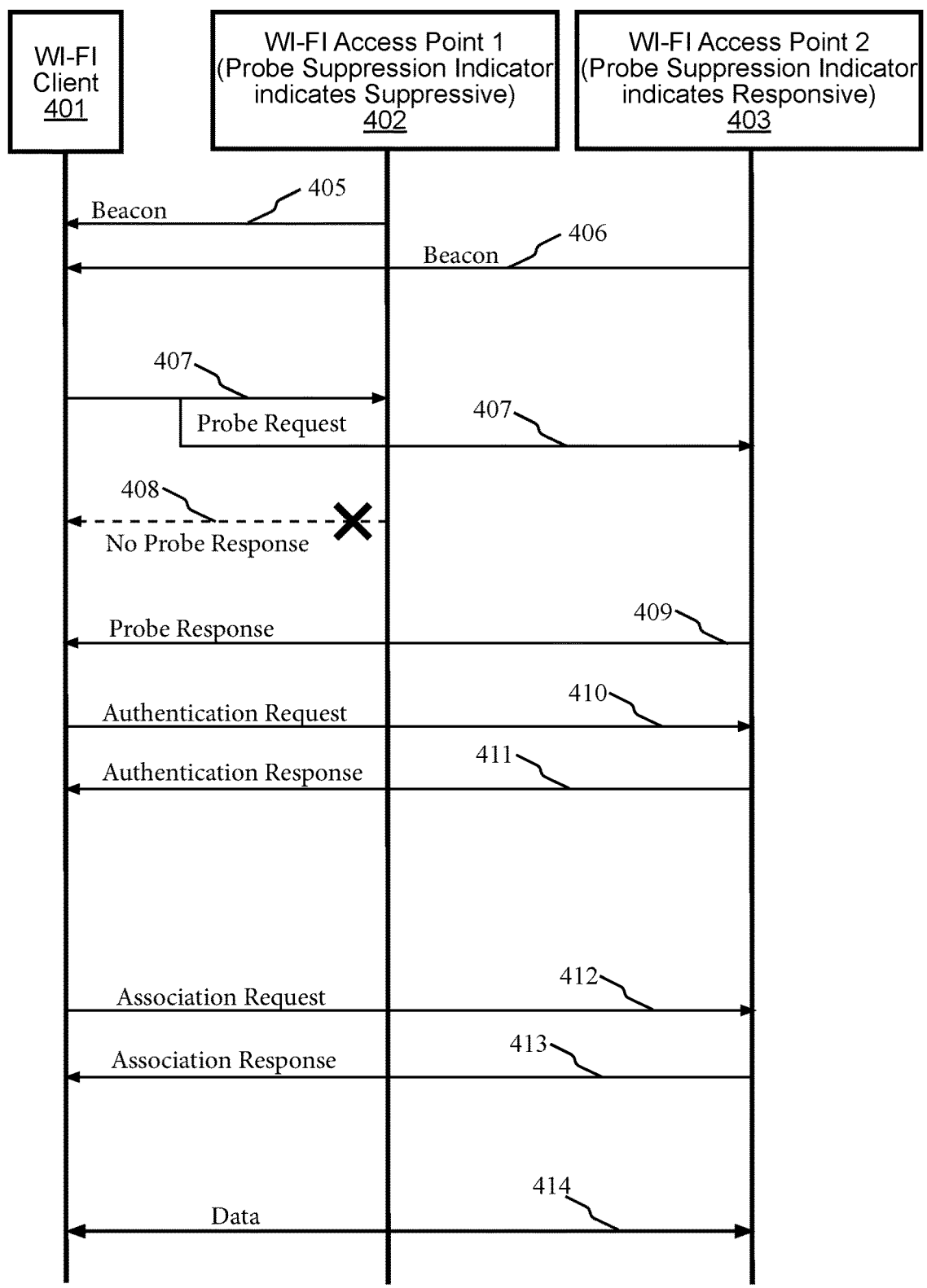
FIG. 4 is a signaling diagram illustrating exemplary signaling to connect a wireless client to a preferred WI-FI access point according to some aspects.

FIG. 4 is a signaling diagram illustrating exemplary signaling to connect a wireless client 401 to a preferred WI-FI access point 403 according to some aspects. Initially, the WI-FI client 401 is not associated with a WI-FI access point. A WI-FI client 401 can listen for WI-FI beacons to thereby discover the SSIDs of the available service sets. WI-FI access point 1 402 and WI-FI access point 2 403 transmit WI-FI beacons 405, 406 that are received by a WI-FI client 401. Both WI-FI access points 402, 403 transmit beacons indicating the same SSID because they are in an active-active deployment for the service set having the SSID. The WI-FI client 401 transmits a probe request 407 that is received by both WI-FI access points 402, 403. The probe request indicates the SSID that was in the beacons transmitted by both access points 402, 403. Both access points 402, 403 receive the WI-FI probe request 407. Access point 1's probe response 408 is suppressed because the probe suppression indictor of WI-FI access point 1 is set to suppressive. WI-FI access point 2 403, having a probe suppression indictor set to responsive, sends a probe response 409. The WI-FI client 401 can then transmit an authentication request 410 that WI-FI access point 2 403 responds to with an authentication response 411. Next, the WI-FI client 401 can transmit an association request 412 that WI-FI access point 2 403 responds to with an association response 413. At this point, the WI-FI client 401 is associated with WI-FI access point 2 403. Being associated, the WI-FI client 401 and WI-FI access point 2 403 can exchange data 414 such as network packets that are forwarded to a WAN, LAN, the internet, etc. For example, the data can include internet protocol (IP) packets that access point 2 403 can forward to a WAN. The details of standardized WI-FI association dialogs, WI-FI beacons, WI-FI probe requests, WI-FI probe responses, WI-FI authentication requests, WI-FI authentication responses, WI-FI association requests, WI-FI association responses, and WI-FI data exchanges are described in the IEEE 802.11 family of standards.

Figure 5A:
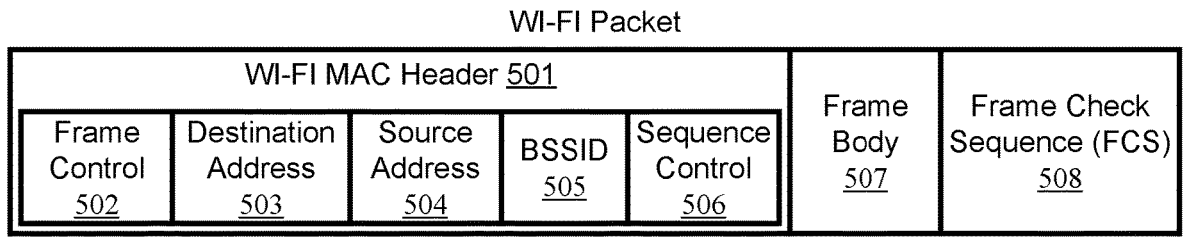
FIGS. 5A, 5B, 5C, and 5D illustrate examples of network packets for use in wireless networks according to some aspects.

FIGS. 5A, 5B, 5C, and 5D illustrate examples of network packets for use in wireless networks according to some aspects. FIG. 5A illustrates a WI-FI packet, sometimes called a WI-FI frame. The WI-FI packet can have a WI-FI MAC (media access control) header 501, a frame body 507, and a frame check sequence (FCS) 508. The frame body 507 can carry data such as IP packets or other data that is used for coordinating WI-FI communications. The frame check sequence is used to validate that the WI-FI packet has not been garbled or corrupted. The WI-FI Mac header 501 can contain fields including frame control 502, destination address 503, source address 504, Base SSID (BSSID), and sequence control 506. The frame control field 502 can indicate the type of frame (e.g. control, management, or data) and related control information. The destination address field 503 can contain the MAC address of the intended destination or a multicast address. The source address field 504 can contain the MAC address of the sender of the packet. The BSSID field 505 can contain a BSSID, which is often the MAC address of a WI-FI access point. The sequence control field 506 can contain a sequence number of the packet and information related to fragmentation and reassembly.

Figure 5B:
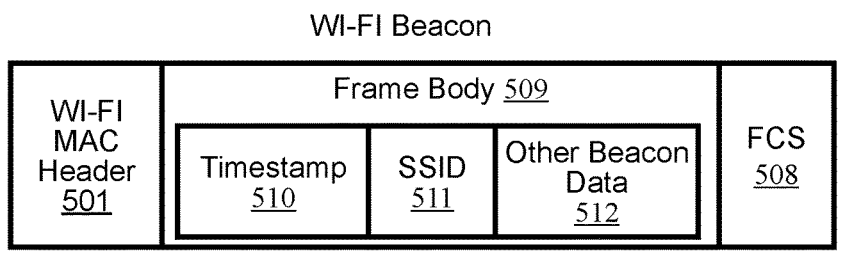

FIG. 5B illustrates a WI-FI beacon. The frame body 509 of a WI-FI beacon can contain a timestamp 510, SSID 511, and other beacon data 512. The timestamp field 510 can indicate when the WI-FI beacon was transmitted. The SSID field can contain a text string indicating the name or identifier for a service set. As discussed above, a service set is a group of WI-FI devices having the same SSID. WI-FI access points can periodically transmit WI-FI beacons to inform WI-FI clients of the availability of the service set identified by the SSID.

Figure 5C:
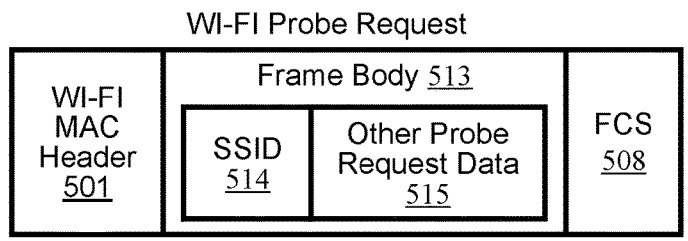

FIG. 5C illustrates a WI-FI probe request. A WI-FI client intending to join a service set having a specific SSID can transmit a WI-FI probe request indicating that SSID. The frame body 513 of a WI-FI probe request can contain the SSID 514 and other probe request data 515.

Figure 5D:
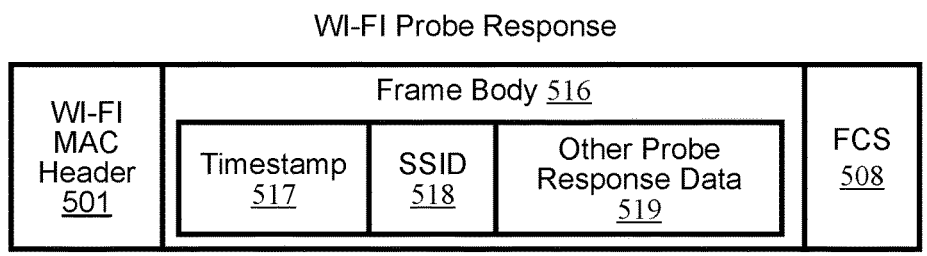

FIG. 5D illustrates a WI-FI probe response. The frame body 516 of a WI-FI probe response can contain a timestamp 517, SSID 518, and other probe response data 519. The timestamp field 517 can indicate when the WI-FI probe response was transmitted. The SSID field can contain the text string identifying the SSID. The recipient of the WI-FI probe response can find the sender's MAC address in the source address field 504 of the MAC header 501 of the probe response. The sender can be a WI-FI access point such as access point 2 403 or HA network node 1 309. As such, a WI-FI client receiving the probe response may thereafter use the sender's MAC address to send packets to the sender.

Figure 6:
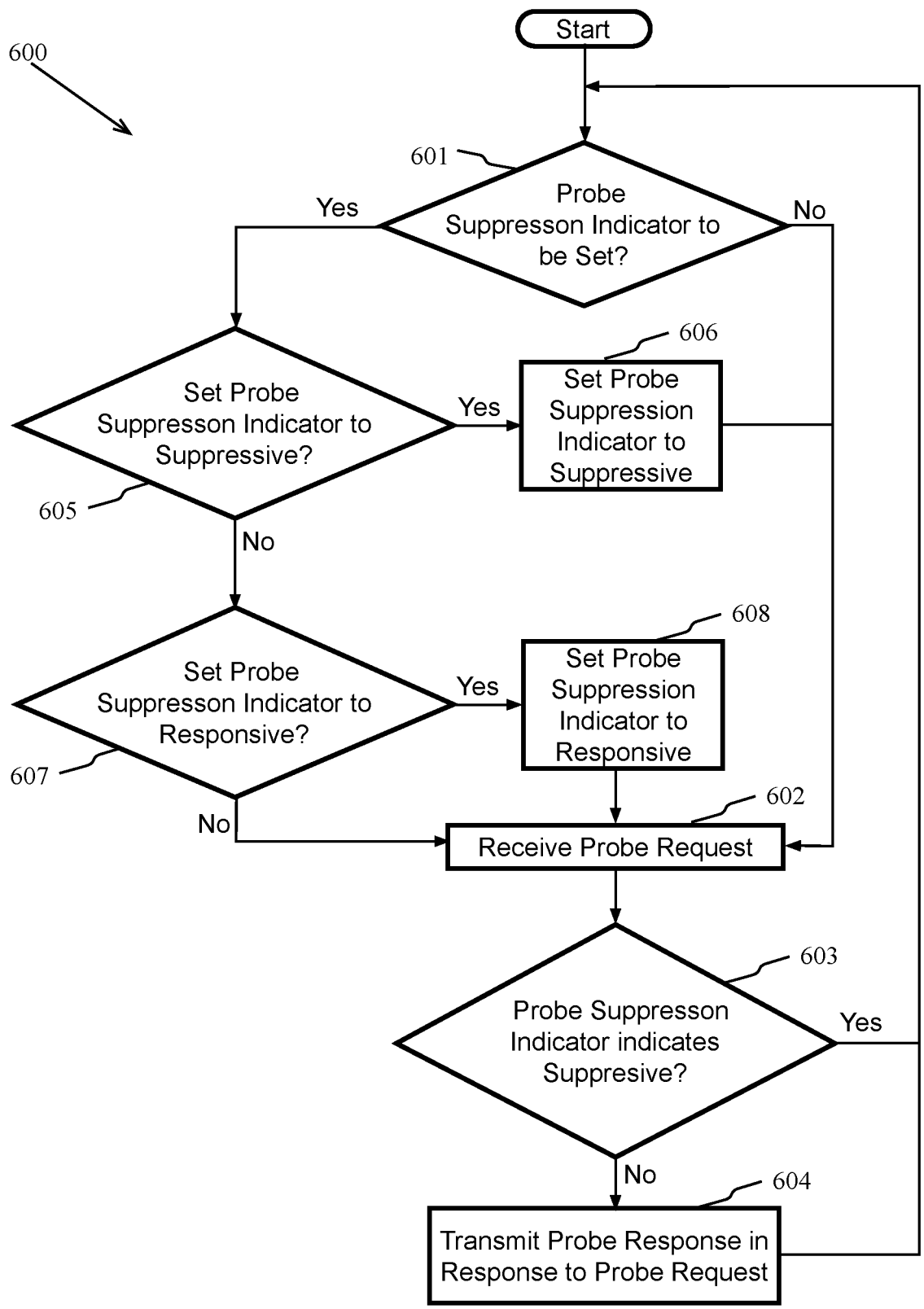
FIG. 6 is a high-level flow diagram of an exemplary method for a WI-FI access point responding to probe requests or suppressing responses to probe requests according to some aspects.

FIG. 6 is a high-level flow diagram of an exemplary method 600 for a WI-FI access point responding to probe requests or suppressing responses to probe requests according to some aspects. After the start, the access point may have received an input directing the access point to set the probe suppression indicator. The input can be received via HA sync 313, via a controller device that coordinates access points within the service set, as a side effect of a VRRP selection of a VRRP virtual master, etc. At block 605, the input is checked to determine if the probe suppression indicator is to be set to suppressive. If so, at block 606 the probe suppression indicator is set to suppressive. If not, at block 607, the input is checked to determine if the probe suppression indicator is to be set to responsive. If so, at block 608 the probe suppression indicator is set to responsive. At block 602, a probe request is received. If, at block 603, the probe suppression indicator indicates suppressive then the process loops back to block 601 without transmitting a probe response, thereby suppressing the probe response. Otherwise, the process continues to block 604 where a probe response is transmitted before the process loops back to block 601.

Figure 7:
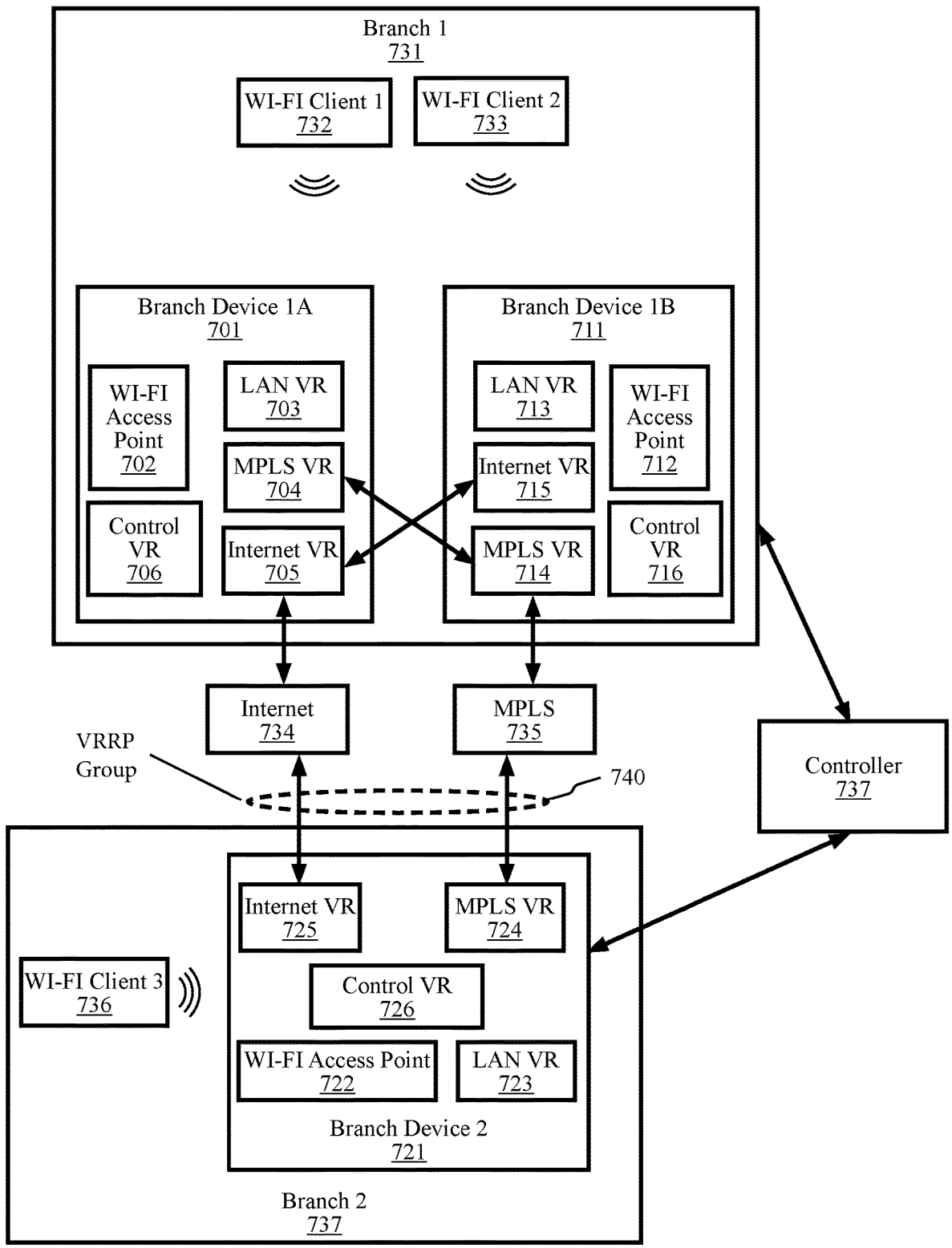
FIG. 7 is a high-level block diagram illustrating an example of an active-active deployment of WI-FI access points according to some aspects.

FIG. 7 is a high-level block diagram illustrating an example of an active-active deployment of WI-FI access points according to some aspects. Two sites, branch 1 731 and branch 2 737, are connected via two network connections 734, 735. One connection is an internet connection 734 that is routed through the internet. The second connection is a MPLS (multi-protocol label switching) connection in which a network provider specifically routes traffic between the sites. In many such deployments, the MPLS connection is faster (e.g. lower latency, etc.), has higher reliability (fewer retries, few lost packets, etc.), may be more secure, and is more expensive. The internet connection can be a backup connection that is likely to deliver packets between the sites but the route taken by those packets may be insecure, suffer substantial packet loss etc. In some deployments, the internet connection 734 and the MPLS connection 735 connecting the sites can be in a VRRP group 740.

Branch 1 731 is served by two branch devices 701, 711 that may be similar to the HA network nodes illustrated in FIG. 3. Branch 2 737 is served by branch device 2 721 that may also be similar to the HA network nodes illustrated in FIG. 3. Branch device 1A 701 serves branch 1 731 and includes a WI-FI access point 702, a control VR (virtual router) 706, a LAN VR 703, a MPLS VR 704, and an internet VR 705. Branch device 1B 711 serves branch 1 731 and includes a WI-FI access point 712, a control VR 716, a LAN VR 713, a MPLS VR 714, and an internet VR 715. Branch device 2 721 serves branch 2 737 and includes a WI-FI access point 722, a control VR 726, a LAN VR 723, a MPLS VR 724, and an internet VR 725. The VRs can be routers instantiated via software in the branch devices. The branch device LAN VRs, MPLS VRs, Internet VRs, and control VRs are not to be confused with VRRP virtual routers. Those practiced in computer networking and virtualization know that the branch device VRs discussed herein are conceptually different from VRRP virtual routers.

The internet engineering task force (IETF) maintains standards for the Internet in the form of requests for comments (RFCs). VRRP is specified by IETF RFC 5798. In VRRP a router (e.g. one of the VRs in the branch devices 701, 711, 721) can be assigned responsibility for a VRRP virtual router. Here, the phrasing is important: a VRRP router can be assigned responsibility for a VRRP virtual router. The branch device VRs can be VRRP routers to which responsibility for VRRP virtual routers can be assigned. VRRP is an election protocol that dynamically assigns responsibility for a VRRP virtual router to one of the VRRP routers on a LAN. The VRRP router controlling the IPv4 or IPv6 address(es) associated with a VRRP virtual router is called the VRRP master, and it forwards packets sent to those IPv4 or IPv6 addresses.

WI-FI access point 702 is an access point incorporated within branch device 1A 701. WI-FI clients, such as WI-FI client 1 732 and WI-FI client 2 733, can associate with WI-FI access point 702 and thereby access the internet or branch 2 737 via branch device 1A 701. WI-FI access point 712 is an access point incorporated within branch device 1B 711. WI-FI clients can associate with WI-FI access point 712 and thereby access the internet or branch 2 737 via branch device 1B 711. WI-FI access point 722 is an access point incorporated within branch device 2 721. WI-FI clients, such as WI-FI client 3 736 can associate with WI-FI access point 722 and thereby access the internet or branch 1 731 via branch device 2 721.

LAN VR 703 can route network traffic on a wired LAN to which branch device 1A 701 is connected, between WI-FI clients associated with the incorporated WI-FI access point 702, and to/from the other VRs in the branch device 1A 701. LAN VR 713 can route network traffic on a wired LAN to which branch device 1B 711 is connected, between WI-FI clients associated with the incorporated WI-FI access point 712, and to/from the other VRs in the branch device 1B 711. LAN VR 723 can route network traffic on a wired LAN to which branch device 2 701 is connected, between WI-FI clients associated with the incorporated WI-FI access point 722, and to/from the other VRs in the branch device 2 721.

Branch device 1A 701 and branch device 1B 711 may be connected via a LAN or WI-FI. As such network traffic between MPLS VR 704 and MPLS VR 714 may be routed through the LAN or WI-FI and via LAN VR 703 and LAN VR 713. Similarly, network traffic between internet VR 705 and internet VR 715 or between control VR 706 and control VR 716 may be routed through the LAN or WI-FI and via LAN VR 703 and LAN VR 713.

The MPLS VRs 704, 714, 724 can route network traffic based on MPLS labels. MPLS VR 704 of branch device 1A 701 can receive network packets from other VRs within branch device 1A 701, add labels and send the packets to MPLS VR 714 which may send them MPLS VR 724 via the MPLS link 735. MPLS VR 704 may receive MPLS labeled packets from another MPLS VR, strip the labels, and route the packets to other VRs within branch device 1A 701. MPLS VR 714 may receive MPLS labeled packets from another MPLS router and forward them to yet another MPLS router based on the MPLS labels.

MPLS VR 714 of branch device 1B 711 can receive network packets from other VRs within branch device 1B 711, add labels and send the packets to MPLS VR 704 or to MPLS VR 724 via the MPLS link 735. MPLS VR 714 may receive MPLS labeled packets from another MPLS VR, strip the labels, and route the packets to other VRs within branch device 1A 701. MPLS VR 714 may receive MPLS labeled packets from another MPLS router and forward them to yet another MPLS router based on the MPLS labels.

MPLS VR 724 of branch device 2 721 can receive network packets from other VRs within branch device 2 721, add labels and send the packets to MPLS VR 714 via the MPLS link 735. MPLS VR 714 may forward the packets to MPLS VR 704. MPLS VR 724 may receive MPLS labeled packets from another MPLS VR, strip the labels, and route the packets to other VRs within branch device 2 721. MPLS VR 724 may receive MPLS labeled packets from another MPLS router and forward them to yet another MPLS router based on the MPLS labels.

Internet VR 705 of branch device 1A 701 can receive network packets from other VRs within branch device 1A 701, route the packets to the internet 734, and route the packets to internet VR 725 via the internet 734. Internet VR 705 may forward packets received from internet VR 715 to the internet and to internet VR 725. Internet VR 705 may receive packets from another internet VR and route the packets to other VRs within branch device 1A 701. Internet VR 705 may receive packets from another Internet router (e.g. internet VRs 715, 725) and forward them to yet another Internet router.

Internet VR 715 of branch device 1B 711 can receive network packets from other VRs within branch device 1B 711, route the packets to the internet 734 via internet VR 705, and route the packets to internet VR 725 via internet VR 705 and the internet 734. Internet VR 715 may receive packets from another internet VR and route the packets to other VRs within branch device 1B 711. Internet VR 715 may receive packets from another Internet router and forward them to yet another Internet router.

Internet VR 725 of branch device 2 721 can receive network packets from other VRs within branch device 2 721, route the packets to the internet 734, and route the packets to internet VR 705 via the internet 734. Internet VR 705 may forward packets from internet VR 725 to the internet and to internet VR 705. Internet VR 725 may receive packets from another internet VR and route the packets to other VRs within branch device 2 721. Internet VR 705 may receive packets from another Internet router and forward them to yet another Internet router.

The control VRs 706, 716, 726 can establish a control plane for configuring, maintaining, and monitoring the branch devices, the VRs within the branch devices, routes between the VRs, etc. For example, a controller 737 can configure a branch device to have an additional MPLS router or to service an additional service set via the WI-FI access point. The control VRs can route control packets between the branch devices and the controller 737. When a control packet reaches its destination, it can cause reconfiguration or other management activity to occur at the destination. For example, the controller can send control packets via the control VRs to cause WI-FI access point 702 to be responsive to WI-FI probe requests and to cause WI-FI access point 712 to suppress responses to WI-FI probe requests.

WI-FI access point 702 can be a preferred a WI-FI access point for branch 1 731 while WI-FI access point 712 is a non-preferred WI-FI access point. As such, the WI-FI clients 732, 733 can receive WI-FI beacons from the WI-FI access points 702, 712 that have the same SSID and can transmit WI-FI probe requests having that SSID. Only the preferred WI-FI access point 702 responds to the WI-FI probe requests with WI-FI probe responses. The non-preferred WI-FI access point 712 suppresses its responses to the probe requests because its probe response indicator indicates suppressive. Referring to FIG. 4, WI-FI access point 702 can be configured to respond as WI-FI access point 2 403 responds. WI-FI access point 712 can be configured to be suppressive as WI-FI access point 1 402 is suppressive.

Figure 8:
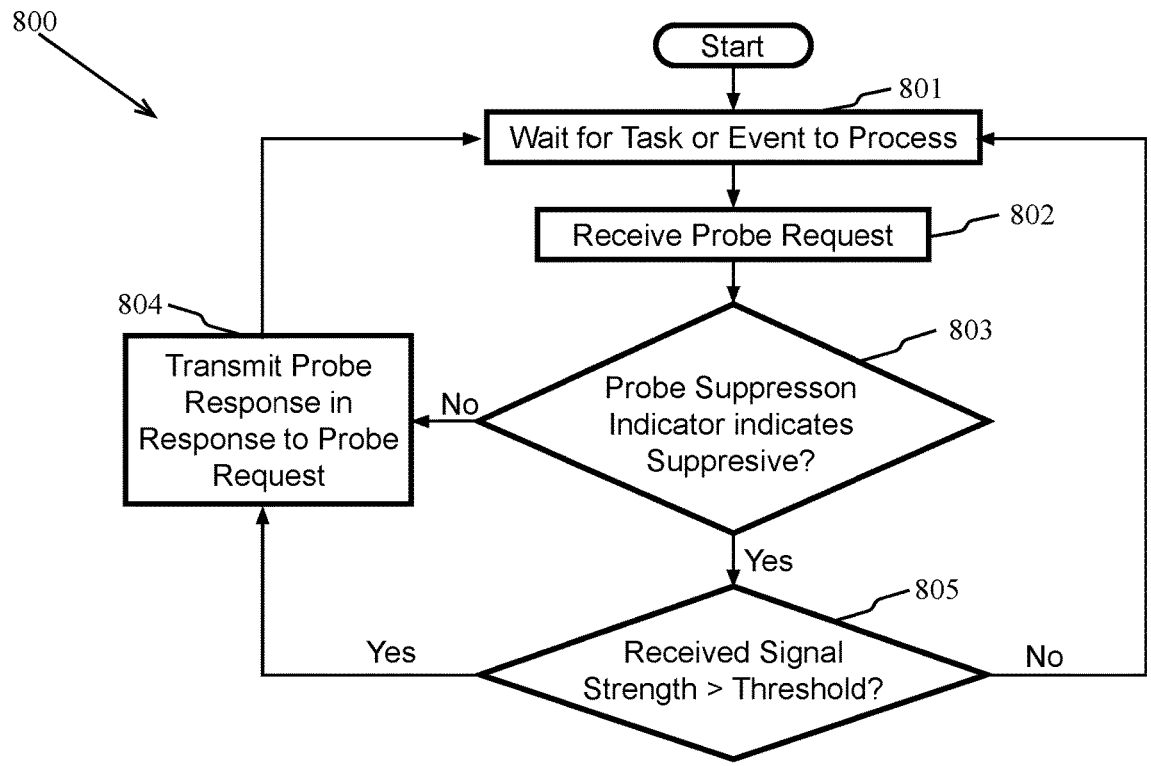
FIG. 8 is a high-level flow diagram of an exemplary method for a non-preferred WI-FI access point transmitting a probe response based on received signal strength according to some aspects.

FIG. 8 is a high-level flow diagram of an exemplary method 800 for a non-preferred WI-FI access point transmitting a probe response based on received signal strength according to some aspects. Here, the WI-FI access point responds to a probe request because a strong signal indicates a high quality WI-FI link. At block 801, an event or task is waited for. A probe request is received as indicated by block 802. If the WI-FI access point's probe suppression indictor does not indicate suppressive at block 803 then the WI-FI access point sends a probe response responsive to the probe request at block 804 before the process loops back waiting for a task or event at block 801. Otherwise, the received signal strength is checked at block 805. If the received signal strength exceeds a threshold value, then the WI-FI access point sends a probe response responsive to the probe request at block 804 before the process loops back to waiting for a task or event at block 801. Otherwise, the process loops back to waiting for a task or event at block 801.

Figure 9:
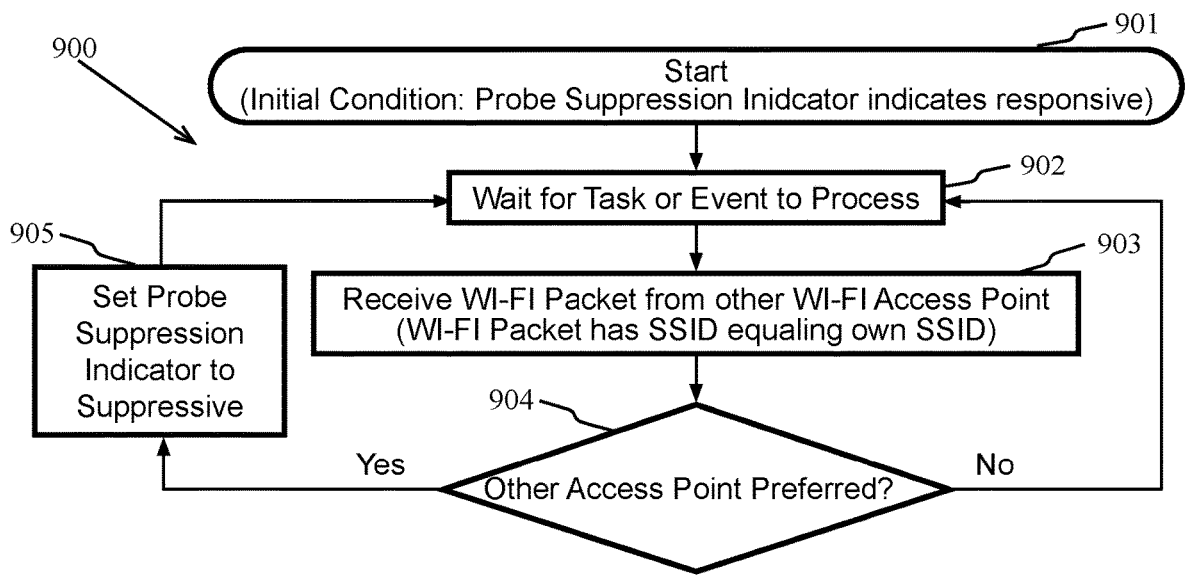
FIG. 9 is a high-level flow diagram of an exemplary method for becoming a non-preferred WI-FI access point after detecting a preferred WI-FI access point according to some aspects.

FIG. 9 is a high-level flow diagram of an exemplary method 900 for becoming a non-preferred WI-FI access point after detecting a preferred WI-FI access point according to some aspects. At the start 901, the WI-FI access point's probe response indicator indicates responsive. An event or task is waited for at block 902. A WI-FI packet is received from another WI-FI access point as indicated by block 903. The WI-FI packet can be a WI-FI beacon, data sent to a WI-FI client or some other type of WI-FI packet. The WI-FI access point can check if that the other WI-FI access point is preferred block 904. For example, the access point may maintain a list of preferred access points for a set of SSIDs, may query a controller, or may check a VRRP status. If the other WI-FI access point is preferred, the WI-FI access point's probe suppression indicator is set to suppressive before the process loops back to waiting for a task or event at block 902. Otherwise, the process loops back to waiting for a task or event at block 902.

Figure 10:
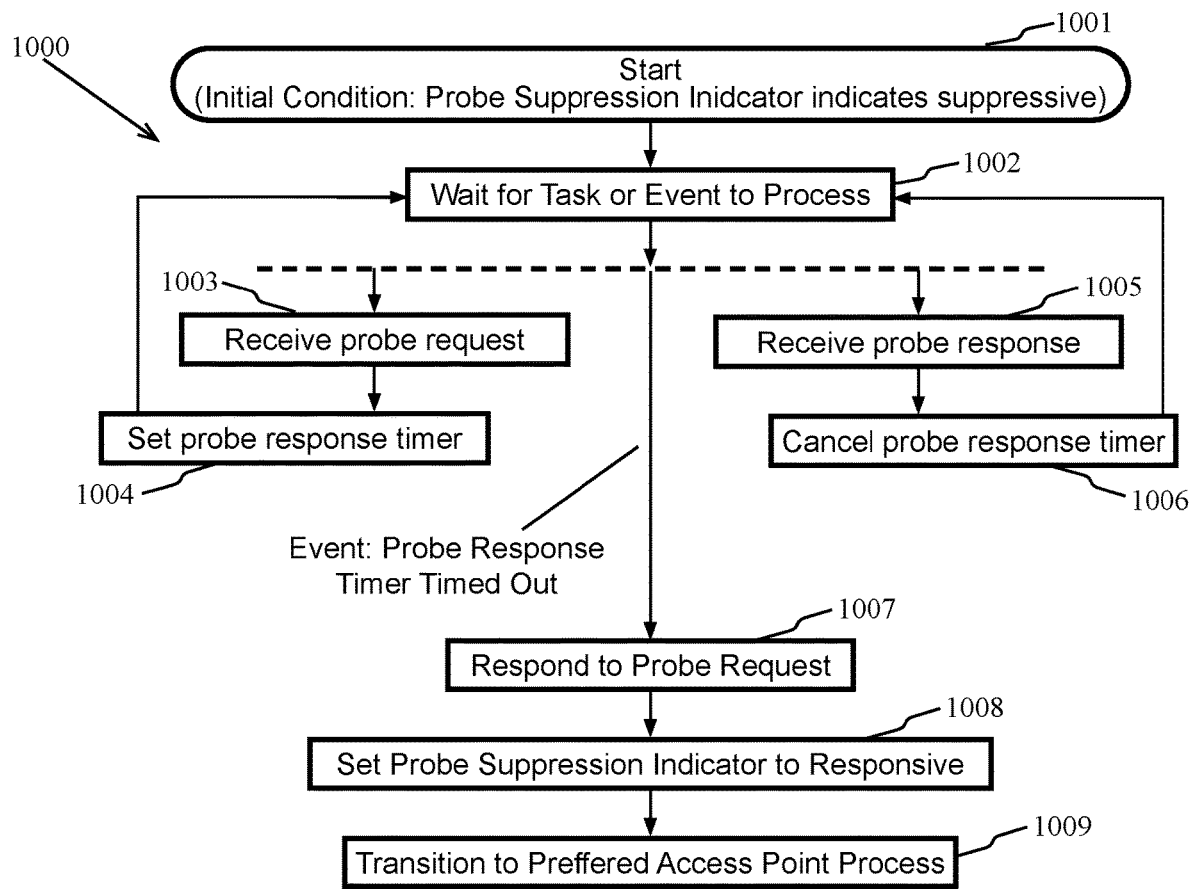
FIG. 10 is a high-level flow diagram of an exemplary method for becoming a preferred WI-FI access point after detecting inactivity of the current preferred WI-FI access point according to some aspects.

FIG. 10 is a high-level flow diagram of an exemplary method 1000 for becoming a preferred WI-FI access point after detecting inactivity of the current preferred WI-FI access point according to some aspects. At the start 1001, the WI-FI access point's probe response indicator indicates suppressive. An event or task is waited for at block 1002. If a probe request is received as indicted by block 1003, then a probe response timer is set at block 1004 before the process loops back to waiting for a task or event at block 1002. If a probe response is received as indicated by block 1005, then the probe response timer is cancelled at block 1006 before the process loops back to waiting for a task or event at block 1002. Here, the WI-FI access point is determining whether another WI-FI access point sends a probe response responsive to the probe request. If the other WI-FI access point responds to the probe request, then the timer is cancelled. If the probe response timer times out, then it may be assumed that the other WI-FI access point is down or for some other reason unable to respond to probe requests from the WI-FI client. If the probe response timer times out, the WI-FI access point may respond to the probe request at block 1007 and may set the probe suppression indicator to responsive at block 1008. The process can transition to a preferred access point process when the probe suppression indicator is set to responsive. A preferred access point process is a process wherein the probe suppression indicator indicates responsive.

Figure 11:
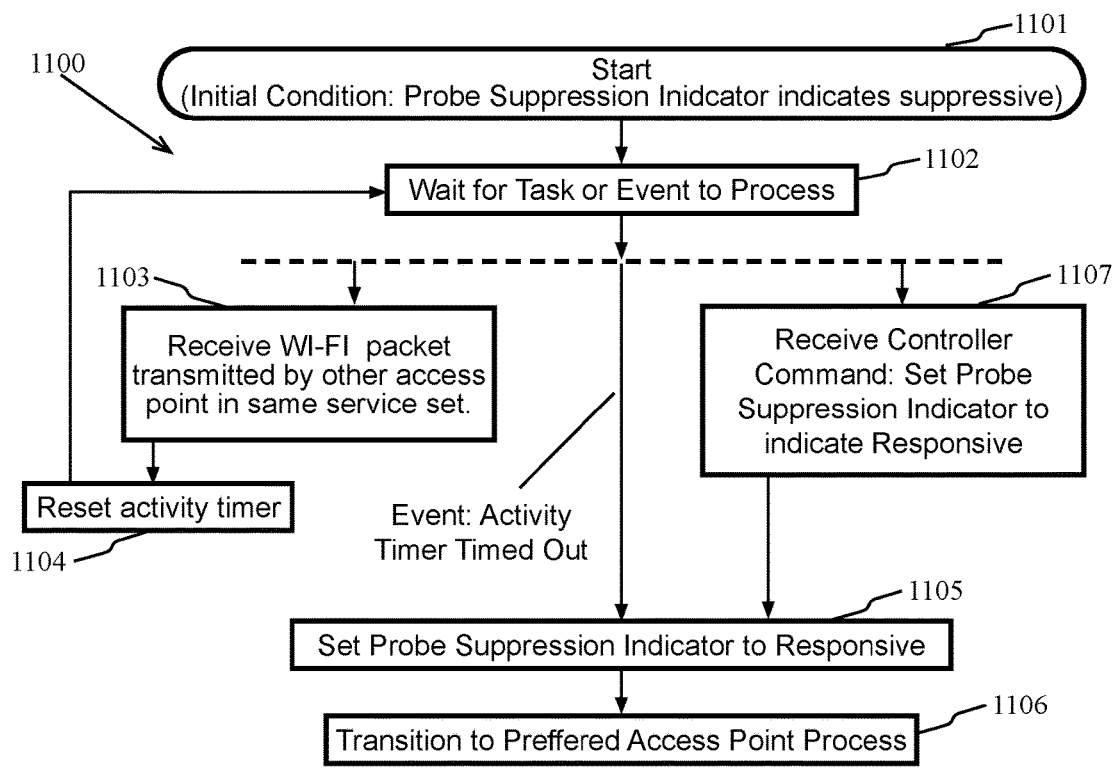
FIG. 11 is a high-level flow diagram of an exemplary method for a non-preferred WI-FI access point becoming a preferred WI-FI access point according to some aspects.

FIG. 11 is a high-level flow diagram of an exemplary method 1100 for a non-preferred WI-FI access point becoming a preferred WI-FI access point according to some aspects. At the start 1101, the WI-FI access point's probe response indicator indicates suppressive. An event or task is waited for at block 1102. If a WI-FI packet is sent by another WI-FI access point in the service set (e.g. a WI-FI beacon or other packet having the SSID of the service set) then that WI-FI packet can be received as indicated by block 1103 and an activity timer can be reset at block 1104. Here, the WI-FI access point is determining that another WI-FI access point is servicing the service set. The activity timer may not expire as long as another WI-FI access point is transmitting WI-FI packets, thereby servicing the service set and causing the activity timer to be repeatedly reset before timing out. If the activity timer does time out, then it may be assumed that no other access point is servicing the service set. Upon a timing out of the activity timer, the probe suppression indicator is set to indicate responsive at block 1105 and the process can transition to a preferred access point process at block 1106. In some aspects, a controller can command the access point to transition to preferred by setting the probe suppression indicator to indicate responsive. The command is received as indicated by block 1107, then the probe suppression indicator is set to indicate responsive at block 1105 and the process transitions to a preferred access point process at block 1106.

Figure 12:
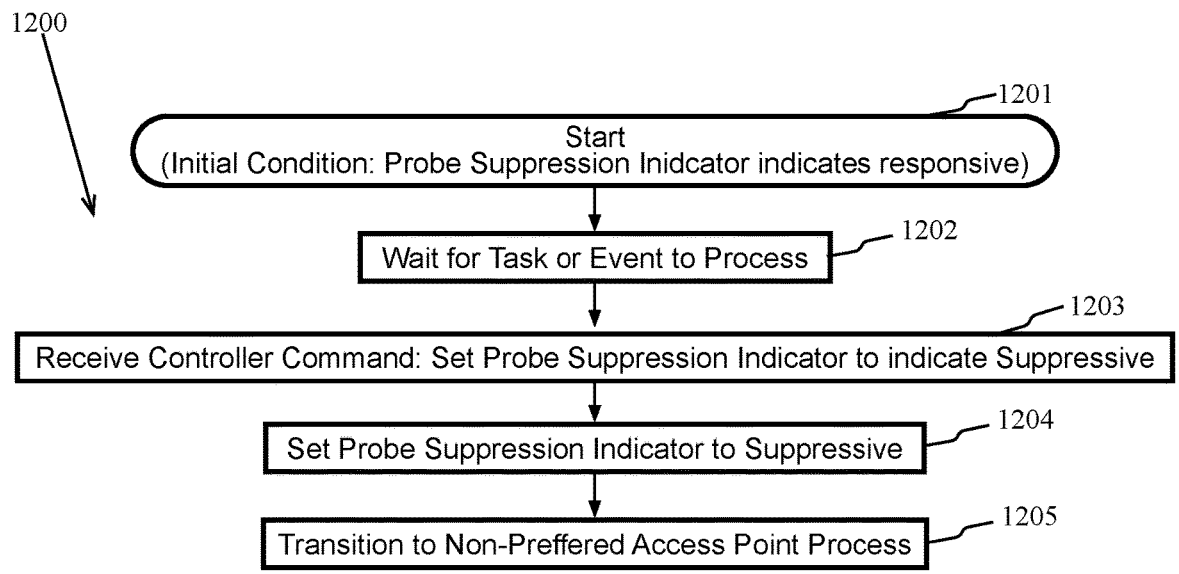
FIG. 12 is a high-level flow diagram of an exemplary method for a preferred WI-FI access point becoming a non-preferred WI-FI access point according to some aspects.

FIG. 12 is a high-level flow diagram of an exemplary method 1200 for a preferred WI-FI access point becoming a non-preferred WI-FI access point according to some aspects. At the start 1201, the WI-FI access point's probe response indicator indicates responsive. An event or task is waited for at block 1202. In some aspects, a controller can command the access point to transition to non-preferred by setting the probe suppression indicator to indicate suppressive. The command is received as indicated by block 1203, then the probe suppression indicator is set to indicate suppressive at block 1204, and the process transitions to a non-preferred access point process at block 1205. A non-preferred access point process is a process wherein the probe suppression indicator indicates suppressive.

Figure 13:
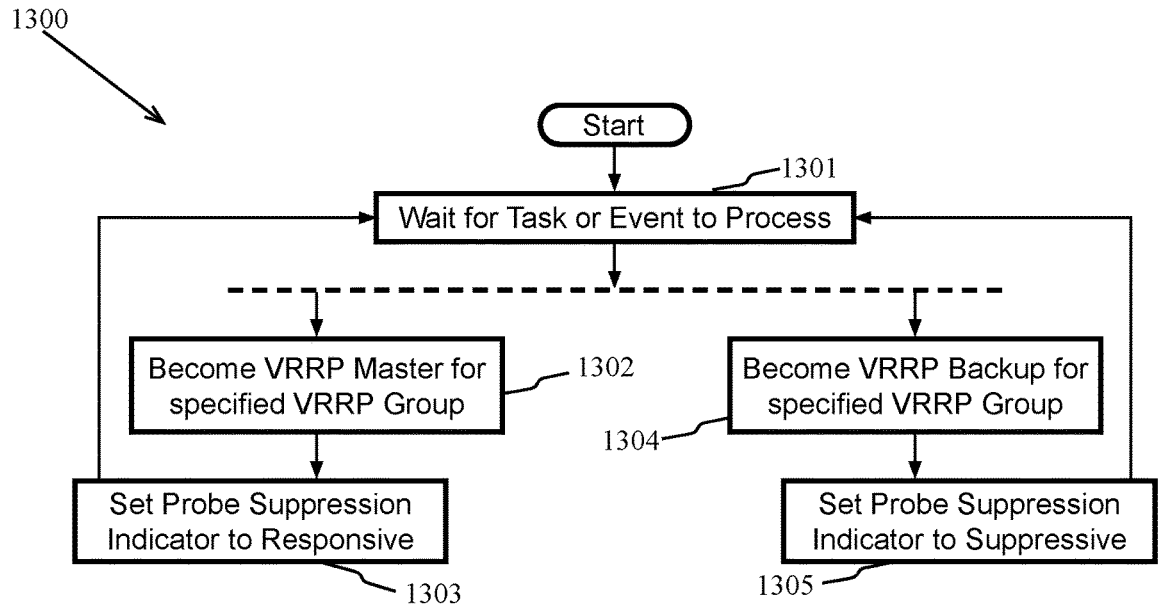
FIG. 13 is a high-level flow diagram of an exemplary method for setting a probe suppression indicator based on a virtual router redundancy protocol (VRRP) status according to some aspects.

FIG. 13 is a high-level flow diagram of an exemplary method 1300 for setting a probe suppression indicator based on a virtual router redundancy protocol (VRRP) status according to some aspects. As discussed above and as specified by IETF RFC 5798, a router can be a VRRP router, the VRRP router controlling the IP address(es) associated with a VRRP virtual router is called the VRRP master, and other routers on a LAN can be VRRP backups. The preferred WI-FI access point can be the device that is the VRRP master while the non-preferred WI-FI access points can be the VRRP backups. After the start, an event or task is waited for at block 1301. When a device becomes a VRRP master for a specific group as indicated by block 1302 then the device's probe suppression indicator can be automatically set to indicate responsive at block 1303 before the process loops back to waiting for a task or event at block 1301. When a device becomes a VRRP backup for a specific group as indicated by block 1304 then the device's probe suppression indicator can be automatically set to indicate suppressive at block 1305 before the process loops back to waiting for a task or event at block 1301. For example, In FIG. 7 the internet connection 734 and the MPLS connection 735 connecting the sites can be in a VRRP group 740. MPLS VR and internet VR 705 can be VRRP routers for the VRRP group. In a non-limiting example, MPLS VR 714 is the VRRP master and internet VR 705 is a VRRP backup for the VRRP group 740. As such, the probe suppression indicator of WI-FI access point 702 indicates responsive and the probe suppression indicator of WI-FI access point 712 indicates suppressive. If internet VR 705 is elected VRRP master for the VRRP group 740, then MPLS VR 714 becomes a VRRP backup, the probe suppression indicator of WI-FI access point 702 is set to indicate suppressive, and the probe suppression indicator of WI-FI access point 712 is set to indicate responsive.

Figure 14:
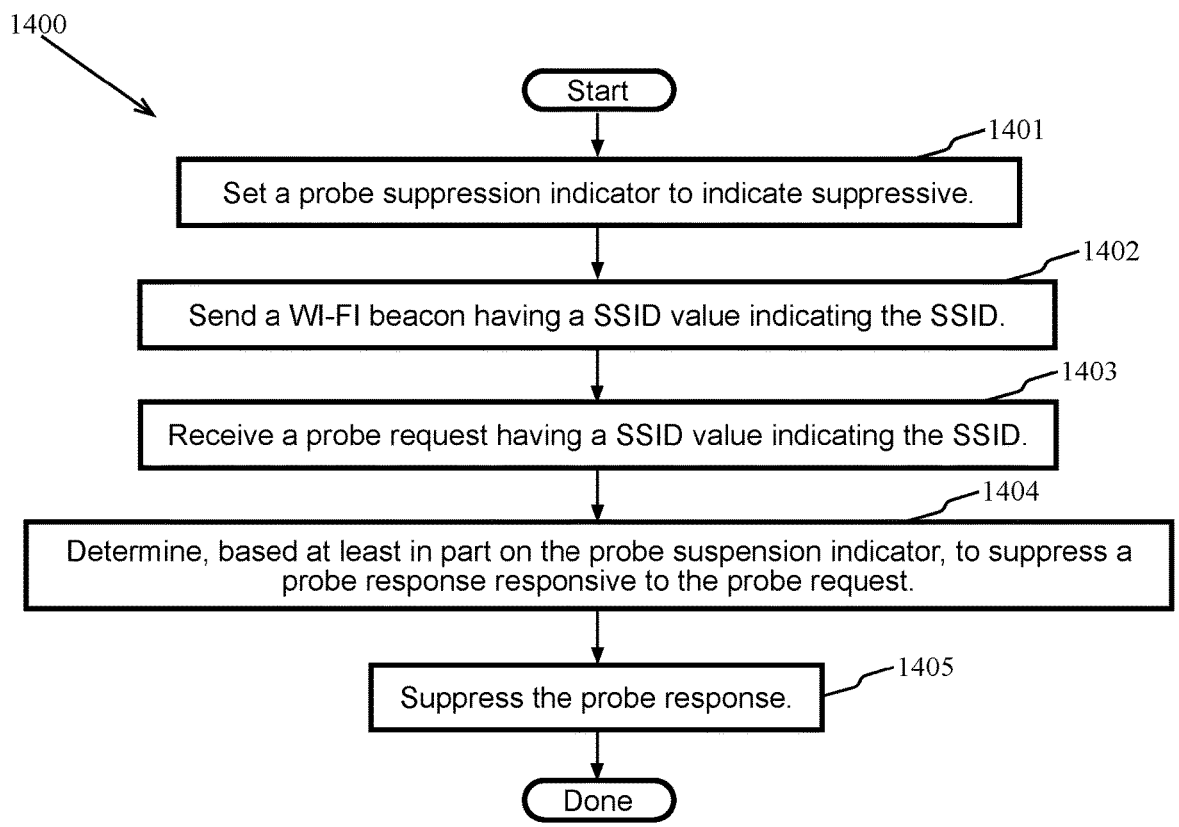
FIG. 14 is a high-level flow diagram of an exemplary method implemented by a WI-FI access point configured to communicate with a service set using a service set identifier (SSID) according to some aspects.

FIG. 14 is a high-level flow diagram of an exemplary method 1400 implemented by a WI-FI access point configured to communicate with a service set using a service set identifier (SSID) according to some aspects. After the start, at block 1401 the method can set a probe suppression indicator to indicate suppressive. At block 1402, the method can send a WI-FI beacon having a SSID value indicating the SSID. At block 1403, the method can receive a probe request having a SSID value indicating the SSID. At block 1404, the method can determine, based at least in part on the probe suspension indicator, to suppress a probe response responsive to the probe request. At block 1405, the method can suppress the probe response.

Figure 15:
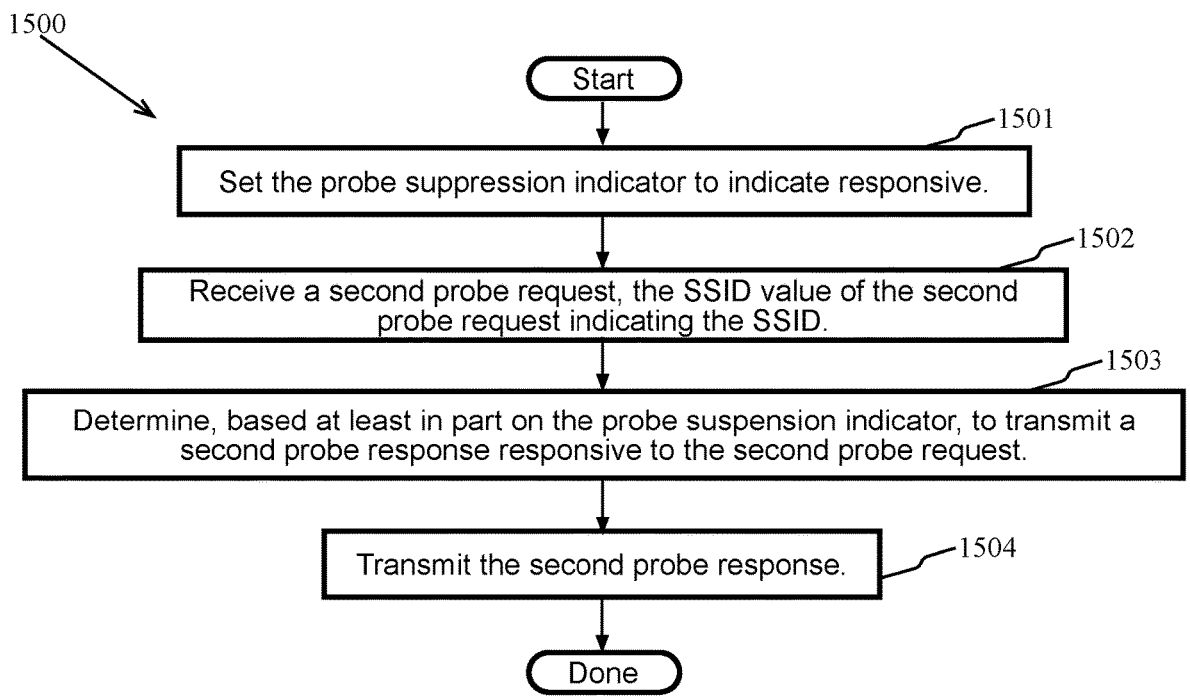
FIG. 15 is a high-level flow diagram of additional steps that can be performed after the exemplary method illustrated in FIG. 14, according to some aspects.

FIG. 15 is a high-level flow diagram of additional steps 1500 that can be performed after the exemplary method illustrated in FIG. 14 according to some aspects. At block 1501, the method can set the probe suppression indicator to indicate responsive. At block 1502, the method can receive a second probe request, the SSID value of the second probe request indicating the SSID. At block 1503, the method can determine, based at least in part on the probe suspension indicator, to transmit a second probe response responsive to the second probe request. At block 1504, the method can transmit the second probe response.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method implemented by a WI-FI access point configured to communicate with a service set using a SSID (service set identifier), the method comprising:
   setting a probe suppression indicator to indicate suppressive;
   sending a WI-FI beacon having a SSID value indicating the SSID;
   receiving a probe request, the SSID value of the probe request indicating the SSID;
   determining, based at least in part on the probe suppression indicator, to suppress a probe response responsive to the probe request; and
   suppressing the probe response.

2. The method implemented by the WI-FI access point of claim 1, the method further comprising: setting the probe suppression indicator to indicate responsive; receiving a second probe request, the SSID value of the second probe request indicating the SSID; determining, based at least in part on the probe suppression indicator, to transmit a second probe response responsive to the second probe request; and transmitting the second probe response.

3. The method implemented by the WI-FI access point of claim 1, the method further comprising: receiving a second probe request, the SSID value of the second probe request indicating the SSID; determining, based at least in part a received signal strength of the second probe request, to transmit a second probe response responsive to the second probe request wherein the probe suppression indicator indicates suppressive; and transmitting the second probe response.

4. The method implemented by the WI-FI access point of claim 1 further comprising: receiving a WI-FI packet from a second WI-FI access point, the SSID value of the WI-FI packet indicating the SSID; determining that the second WI-FI access point is preferred over the WI-FI access point for the SSID; and setting the probe suppression indicator to suppressive.

5. The method implemented by the WI-FI access point of claim 1 further comprising: transmitting the probe response after determining that a second WI-FI access point is unresponsive to the probe request.

6. The method implemented by the WI-FI access point of claim 1 further comprising: setting the probe suppression indicator to responsive after determining that a second WI-FI access point is unresponsive to the probe request.

7. The method implemented by the WI-FI access point of claim 1 further comprising: setting the probe suppression indicator to responsive in accordance with a command received from a controller, wherein the probe suppression indicator of a second WI-FI access point is set to suppressive in response to another command sent by the controller.

8. The method implemented by the WI-FI access point of claim 1 further comprising: keeping an activity timer that times out after an elapsed time since a second WI-FI access point has transmitted a WI-FI packet for the SSID; and setting the probe suppression indicator to responsive in response to the activity timer timing out.

9. The method implemented by the WI-FI access point of claim 1 wherein: the WI-FI access point and a second WI-FI access point are in a virtual router redundancy protocol (VRRP) group having a VRRP master and a VRRP backup, the probe suppression indicator of the WI-FI access point indicates responsive when the WI-FI access point is the VRRP master, the probe suppression indicator of the second WI-FI access point indicates responsive when the second WI-FI access point is the VRRP master, the probe suppression indicator of the WI-FI access point indicates suppressive when the WI-FI access point is the VRRP backup, and the probe suppression indicator of the second WI-FI access point indicates suppressive when the second WI-FI access point is the VRRP backup.

10. A WI-FI access point configured to:
    communicate with a service set using a SSID (service set identifier);
    set a probe suppression indicator to indicate suppressive;
    send a WI-FI beacon having a SSID value indicating the SSID;
    receive a probe request, the SSID value of the probe request indicating the SSID; and
    suppress, based at least in part on the probe suppression indicator, a probe response responsive to the probe request.

11. The WI-FI access point of claim 10, wherein the WI-FI access point is further configured to: set the probe suppression indicator to indicate responsive; receive a second probe request, the SSID value of the second probe request indicating the SSID; determine, based at least in part on the probe suppression indicator, to transmit a second probe response responsive to the second probe request; and transmit the second probe response.

12. The WI-FI access point of claim 10, wherein the WI-FI access point is further configured to: receive a second probe request, the SSID value of the second probe request indicating the SSID; determine, based at least in part a received signal strength of the second probe request, to transmit a second probe response responsive to the second probe request wherein the probe suppression indicator indicates suppressive; and transmit the second probe response.

13. The WI-FI access point of claim 10, wherein the WI-FI access point is further configured to: receive a WI-FI packet from a second WI-FI access point, the SSID value of the WI-FI packet indicating the SSID; determine that the second WI-FI access point is preferred over the WI-FI access point for the SSID; and set the probe suppression indicator to suppressive.

14. The WI-FI access point of claim 10, wherein the WI-FI access point is further configured to: transmit the probe response after determining that a second WI-FI access point is unresponsive to the probe request.

15. The WI-FI access point of claim 10, wherein the WI-FI access point is further configured to: set the probe suppression indicator to responsive after determining that a second WI-FI access point is unresponsive to the probe request.

16. The WI-FI access point of claim 10, wherein the WI-FI access point is further configured to: set the probe suppression indicator to responsive in accordance with a command received from a controller, wherein the probe suppression indicator of a second WI-FI access point is set to suppressive in response to another command sent by the controller.

17. The WI-FI access point of claim 10, wherein the WI-FI access point is further configured to: keep an activity timer that times out after an elapsed time since a second WI-FI access point has transmitted a WI-FI packet for the SSID; and set the probe suppression indicator to responsive in response to the activity timer timing out.

18. The WI-FI access point of claim 10, wherein: the WI-FI access point and a second WI-FI access point are in a virtual router redundancy protocol (VRRP) group having a VRRP master and a VRRP backup, the probe suppression indicator of the WI-FI access point indicates responsive when the WI-FI access point is the VRRP master, the probe suppression indicator of the second WI-FI access point indicates responsive when the second WI-FI access point is the VRRP master, the probe suppression indicator of the WI-FI access point indicates suppressive when the WI-FI access point is the VRRP backup, and the probe suppression indicator of the second WI-FI access point indicates suppressive when the second WI-FI access point is the VRRP backup.

19. A WI-FI access point comprising:
  access point means for communicating with a service set using a service set identifier (SSID);
  access point means for indicating a state as suppressive or responsive for the SSID;
  access point means for setting the state;
  access point means for changing the state;
  access point means for transmitting a beacon, the beacon having access point means for indicating the SSID;
  access point means for receiving a probe request, the probe request having access point means for indicating the SSID;
  access point means for suppressing a probe response based on the state; and
  access point means for transmitting the probe response based on the state.

20. The WI-FI access point of claim 19 further comprising access point means for coordinating the state with a second state of a second WI-FI access point, the second WI-FI access point comprising:
  second access point means for communicating with the service set using the service set identifier (SSID);
  access point means for indicating the second state as suppressive or responsive for the SSID;
  access point means for setting the second state;
  access point means for changing the second state;
  second access point means for receiving the probe request;
  access point means for suppressing a second probe response based on the second state; and
  access point means for transmitting the second probe response based on the second state.

* * * * *